United States Patent
Buchheit et al.

(10) Patent No.: US 8,549,071 B2
(45) Date of Patent: *Oct. 1, 2013

(54) METHODS AND SYSTEMS FOR TRANSFERRING CLIENT DEVICE DATA OVER A NETWORK

(75) Inventors: Paul T. Buchheit, Mountain View, CA (US); Jing Yee Lim, Santa Clara, CA (US); Sanjeev Singh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,364

(22) Filed: Sep. 14, 2012

(65) Prior Publication Data

US 2013/0103792 A1  Apr. 25, 2013

Related U.S. Application Data

(60) Continuation of application No. 12/886,311, filed on Sep. 20, 2010, now Pat. No. 8,346,855, which is a division of application No. 11/026,682, filed on Dec. 31, 2004, now Pat. No. 7,801,948.

(51) Int. Cl.
*G06F 15/16* (2006.01)

(52) U.S. Cl.
USPC ........... 709/203; 709/223; 709/224; 709/227; 709/236

(58) Field of Classification Search
USPC .......................... 709/203, 223, 224, 227, 236
See application file for complete search history.

(56) References Cited

FOREIGN PATENT DOCUMENTS
EP  1180887 A1 *  2/2002

\* cited by examiner

*Primary Examiner* — Wing F Chan
*Assistant Examiner* — Benjamin M. Thieu
(74) *Attorney, Agent, or Firm* — Fish & Richardson P.C.

(57) ABSTRACT

Systems and methods for the transfer of client device data on a network are described. One described method comprises causing non-time-sensitive client device data to be identified on a client device, causing the non-time-sensitive client device data to be prepared for output and stored by the client device, and causing the non-time-sensitive client device data to be output with a request signal upon satisfaction of a condition.

22 Claims, 2 Drawing Sheets

US 8,549,071 B2

METHODS AND SYSTEMS FOR TRANSFERRING CLIENT DEVICE DATA OVER A NETWORK

CLAIM OF PRIORITY

This application is a continuation and claims priority under 35 USC §119(e) to U.S. patent application Ser. No. 12/886,311, filed Sep. 20, 2010, now U.S. Pat. No. 8,346,855 issued Jan. 1, 2013, which is a divisional of U.S. patent application Ser. No. 11/026,682 filed Dec. 31, 2004, now U.S. Pat. No. 7,801,948 issued Sep. 21, 2010, the entire contents of which are hereby incorporated by reference.

FIELD OF THE INVENTION

The present invention relates generally to methods and systems for data transfer and, more particularly, to methods and systems for transferring client device data over a network.

BACKGROUND

When transferring data, it may be desirable to decrease the number of total transmissions made between communicating devices. Similarly, it may be desirable to decrease the total bandwidth used for low priority data transmissions over a network. In the context of such a network, data on a client device in communication with the network may be of interest to a server device also in communication with the network, but may not be time-sensitive. This data can include system configuration data and user interaction data. Such data may be transferred to the server device from the client device, but each such transmission increases the total number of transmissions and decreases the amount of total bandwidth available for other transmissions. Also, each such transmission uses resources of both the client device and the server device.

SUMMARY

Embodiments of the present invention provide methods and systems for transferring client device data over a network. One embodiment of the present invention comprises causing non-time-sensitive client device data to be identified on a client device, causing the non-time-sensitive client device data to be prepared for output and stored by the client device, and causing the non-time-sensitive client device data to be output with a request signal upon satisfaction of a condition.

Another embodiment of the present invention comprises generating an instruction signal, the instruction signal comprising at least a first instruction to prepare non-time-sensitive client device data for outputting, a second instruction to store the non-time-sensitive client device data, and a condition for outputting the non-time-sensitive client device data with a request signal, outputting the instruction signal to a client device, receiving the request signal from the client device, identifying the non-time-sensitive client device data in the request signal, and extracting the non-time-sensitive client device data.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for improving text segmentation using frequency. There are multiple embodiments of the present invention. By way of introduction and example, one exemplary embodiment of the present invention, provides a method for transferring client device data over a network. For example, in one embodiment of the present invention, a request signal, such as an HTTP GET, requesting access to web page is received at a server device from a client device. The server device receiving the request signal may maintain the web page. The server device may output an instruction signal to the client device in response to receiving the request signal. The instruction signal may include the web page requested and an instruction, such as a JavaScript program, embedded in the web page. The web page and instruction may be output to the client device over a network, such as the Internet.

In one embodiment, the instruction, when received by the client device, causes the client device to identify non-time-sensitive client device data. Examples of non-time-sensitive client device data comprise configuration data and user interaction data. The client device is then caused by the instruction to store and prepare for output the non-time-sensitive client device data. The non-time-sensitive client device data is then caused by the instruction to be output with a request signal upon satisfaction of a condition. The condition may comprise, for example, storing the client device data for a predetermined length of time, storing a predetermined amount of client device data, and/or generation of another request signal by the client device.

In one embodiment, non-time-sensitive client device data is stored in one or more HTTP cookies. Upon satisfaction of the condition, the HTTP cookie or cookies containing the non-time-sensitive client device data are output with a request, such as HTTP request, from the client device. The HTTP cookie or cookies may be included as extra parameters with the request output to the server device. The HTTP cookie may then be reset by the server device after the non-time-sensitive client device data is extracted from the HTTP cookie by the server device. In another embodiment, the non-time-sensitive client device data is individually marked and stored in memory associated with an application that is running on the client device and is output based on a condition set by the instruction.

This introduction is given to introduce the reader to the general subject matter of the application. By no means is the invention limited to such subject matter. Exemplary embodiments are described below.

System Architecture

Figure 1:
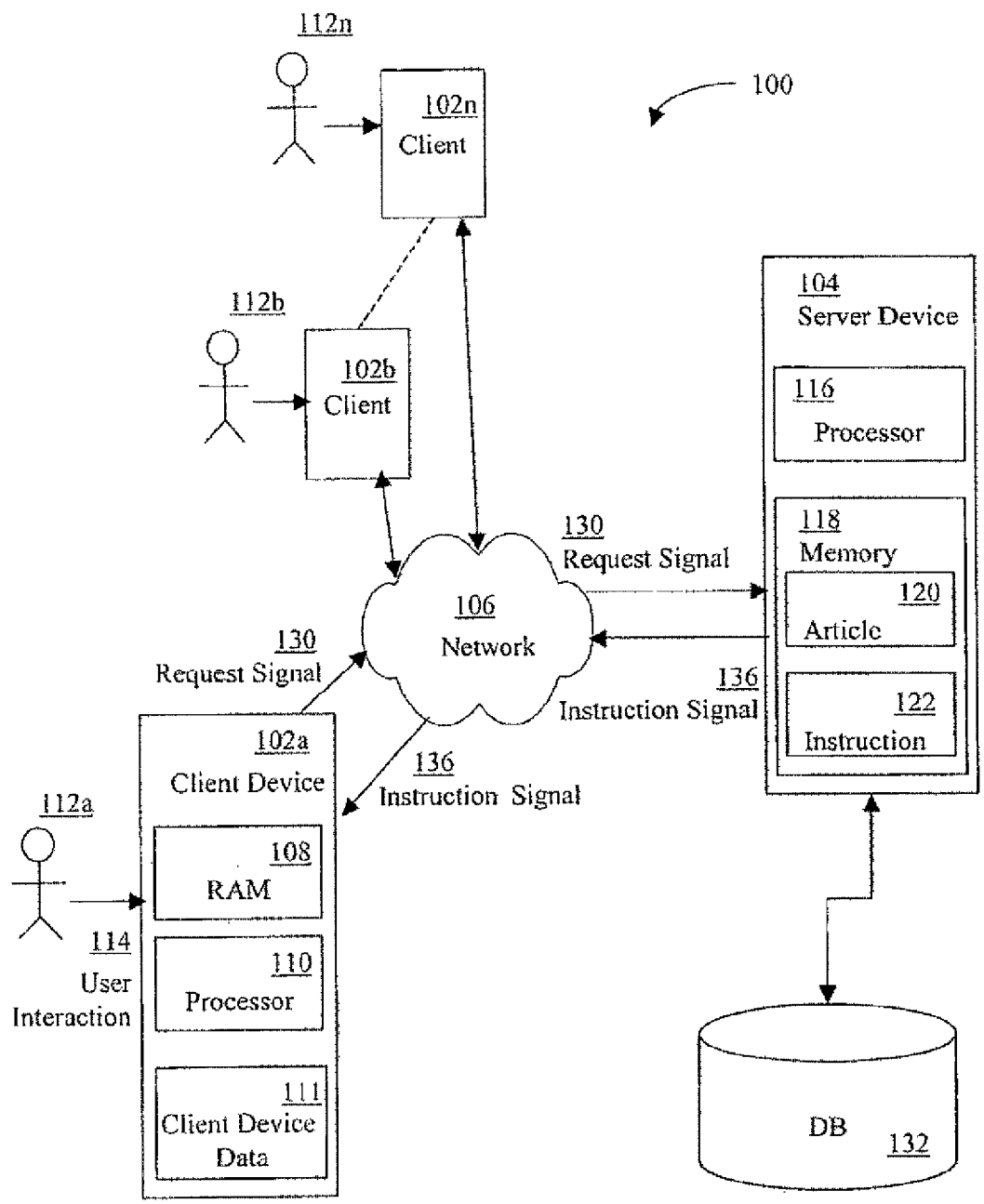
FIG. 1 is a block diagram illustrating an exemplary environment n which one embodiment of the present invention may operate.

Referring now to the drawings in which like numerals indicate like elements throughout the several figures, FIG. 1 is a block diagram illustrating an exemplary environment in which one embodiment of the present invention may operate. The system 100 shown in FIG. 1 comprises multiple client devices 102a-n in communication with a server device 104 over a network 106. The network 106 shown comprises the Internet. In other embodiments, other networks, such as an intranet may be used. Moreover, methods according to the present invention may operate within a single computer.

The client devices 102a-n shown each comprise a computer-readable medium, such as a random access memory (RAM) 108, read only memory (ROM), and/or a storage device (such as a hard drive), coupled to a processor 110. The processor 110 executes computer-readable program code stored in memory 108 or other computer readable medium. Such processors may include a microprocessor, an ASIC, and state machines. Such processors include, or may be in communication with, media, for example computer-readable media, which stores instructions that, when executed by the processor, cause the processor to perform actions. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is in communication with a network 106 and that interacts with one or more application programs. Client devices 102a-n may operate on any operating system, such as an operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

The client device 102a further comprises client device data 111, such as configuration data. In one embodiment, the configuration data may be located in the client device's 102a memory 108. The configuration data may also be located in an associated storage device, such as a hard drive. The configuration data can relate to the configuration of the client device and may comprises a physical characteristic of the client device 102a or of an application being executed on the client device 102a, such as a physical size of a display device screen, an audio setting, or a type of pointing device being operated by the user 112a. The configuration data may further comprise a user 112a input characteristic of the client device 102a or of an application being executed on the client device 102a, such as a user 112a preference for receiving, previewing or opening email messages, a user 112a set home page on the Internet, or other such characteristic. In the embodiment shown, the user 112a communicates with the client device 102a through a user interaction 114. The user interaction 114 may comprise a request or a command entered through an external device such as a keyboard or a mouse.

Through the client devices 102a-n, users 112a-n can communicate over the network 106 with each other and with other systems and devices coupled to the network 106. As shown in FIG. 1, a server device 104 is also coupled to the network 106. Similar to the client devices 102a-n, the server device 104 shown comprises a processor 116 coupled to a computer-readable memory 118. Program code in the server device's 104 computer-readable memory 118 may comprise instructions to implement the methods described herein. The processor 116 executes computer-readable program code stored in the memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

As shown in FIG. 1, memory 118 has stored therein an article 120, such as a web page, an electronic mail message, an image, or a sound file hosted by the server device 104. An article 120 may include, for example, web pages of various formats, such as HTML, XML, XHTML, Portable Document Format (PDF) files, electronic mail messages, instant messenger messages, and word processor, database, and application program document files, audio, video, or any other documents or information of any suitable type whatsoever made available on a network 106 (such as the Internet), a personal computer, or other computing or storage means. The embodiments described herein are described generally in relation to HTML files or documents, but embodiments may operate on any suitable type of article 120, including any type of image. The article 120 may be located in an associated storage device.

Memory 118 further has stored therein an instruction 122. The instruction 122 shown in FIG. 1 can comprise a JavaScript program. In other embodiments the instruction 122 may be a computer program written in another computer language or may be electrical signals. The instruction 122 may be embedded in the document. For example, a JavaScript program instruction 122 may be embedded in the HTML code of a web page article 120. The instruction 122 can instruct the client device 102a to perform certain actions once it has been output over the network 106 to the client device 102a.

The article 120 can be displayed on the client device 102a in response to a request signal 130 generated by the client device 102a. The request signal 130 can be generated in response to the user interaction 114 from the user 112a. For example, the user interaction 114 may comprise a request by the user 112a for access to the article 120, such as by clicking on a hyperlink associated with a web page article 120 the user 112a wishes to view using a web browser application being run by the client device 102a. The request signal 130 may comprise, for example, an HTTP GET or an HTTP POST request signal 130.

The request signal 130 generated by the client device 102a may be output to the server device 104 over the network 106. The request signal 130 shown in FIG. 1 comprises data from which the server device 104 can ascertain that the client device 102a is requesting access to the article 120. In response to receiving the request signal 130, the processor 116 can retrieve the article 120 from the memory 118 or storage device. The processor 116 can also retrieve the instruction 122 from the memory 118 or storage device in response to receiving the request signal 130. The processor 116 can then generate an instruction signal 136 comprising the article 120 and the instruction 122. For example, the instruction signal 136 may comprise the content of a user-requested web page article and a JavaScript program instruction.

The instruction signal 136 generated by the server device 104 can be output to the client device 102a over the network 106. Upon receiving the instruction signal 136, the client device 102a can display the article 120 on an associated display device for viewing by the user 112a. The processor 110 can execute the instruction 122 in the instruction signal 136. The instruction 122 shown in FIG. 1 comprises a JavaScript program. The JavaScript program instruction 122 may instruct the client device 102a to identify client device data on the client device 102a. In the embodiment shown in FIG. 1, the instruction 122 instructs the client device 102a to identify client device data that is not time-sensitive.

Non-time-sensitive client device data can be any data that a delay in receipt by the server device 104 will not materially affect the user's 112a experience in accessing the article 120, in interacting with the network 106, or in communicating with the server device 104. Non-time-sensitive client device data may comprise configuration data and user interaction data. Configuration data may comprise the size of the client device's 102a display and any other relevant client device 102a configuration information. Client device data may also comprise user interaction data. User interaction data may comprise the portion of the web page article 120 visible on the client device's 102a display, information about what web pages, email messages, or other articles 120 the user 112a has viewed, the time associated with viewing the article 120, how a user 112a views the article 120, whether the user 112a followed a hyperlink contained in the article 120 by clicking on the hyperlink, whether the user 112a accessed an attachment to an email message article 120, or other information associated with a user's 112a interaction with the article 120, with other articles or entities on the network 106, or with the server device 104.

The instruction 122 shown in FIG. 1 further instructs the client device 102a to prepare for output and store the non-time-sensitive client device data. Client device data that is time-sensitive may be output by the client device 102a in a request signal 130 generated solely for outputting the time-sensitive client device data. The non-time-sensitive client device data can be prepared for output by setting it in an HTTP cookie. In other embodiments, the client device data may be prepared for output using a suitable alternative method or device. For example, in one embodiment the non-time-sensitive client device data may be individually marked and stored in memory associated with an application, such as a web browser or an email program, that is currently running on the client device 102a, and may be output at a later time according to a condition defined by the instruction 122.

The non-time-sensitive client device data may also include expiration data provided by the instruction 122. Expiration data includes information regarding the expiration of the non-time-sensitive client device data. For example, the expiration data may indicate that the non-time-sensitive client device data expires after the current browser session or after a certain period of time. In one embodiment, the non-time-sensitive client device data may not be output if it has expired according to the expiration data.

The instruction 122 in the embodiment shown in FIG. 1 further instructs the client device 102a to output the prepared non-time-sensitive client device data with a request signal 130 upon satisfaction of a condition. In the embodiment shown, the condition may comprise the generation of the next request signal 130 by the client device 102a in response to user interaction 114 by the user 112a. The condition may comprise a different or an additional criterion, such as the storage and preparation for output of n pieces of non-time-sensitive client device data in the client device 102a, where n is a predetermined positive integer. The condition may alternatively or additionally comprise the storage of the non-time-sensitive client device data in the client device 102a for a specified period of time, or the closing of an application the user 112a used to request the article 120 from the server device 104.

The client device 102a in the embodiment shown can output to the server device 104 the non-time-sensitive client device data set in the prepared HTTP cookie included with the next-generated user request in the next-generated request signal 130. The next-generated user request signal may comprise a request for access to another article from server device 104 and can be an HTTP GET request signal. The next-generated request signal may comprise input to an article and can be an HTTP POST request signal. The non-time-sensitive client device data can be included in the request signal as extra parameters. The server device 104 receives the next-generated request signal 130 and can examine it for the presence of client device data. If, as in the embodiment shown in FIG. 1, the next-generated request signal 130 comprises client device data, the processor 116 of the server device 104 can retrieve the client device data from the request signal 130.

The client device data in the embodiment shown in FIG. 1 can then be stored in a database 132 in communication with the server device 104. In one embodiment, the server device 104 may later use the client device data stored in the database 132. For example, the server device may later user the stored client device data to improve server device's 104 system performance, learn about the activities and interests of the user 112a, and to aggregate the usage patterns of all users of the article 120.

In the embodiment shown, the processor 116 can reset the HTTP cookie upon storing the client device data in the database 134. For example, the processor 116 may reset the HTTP cookie by setting a cookie expiration date that has already passed. The processor 116 shown can then process the next-generated user request in the next-generated request signal 130. In one embodiment, the server device 104 may generate a new instruction signal 136 that may comprise the instruction 122 a new instruction, or the reset HTTP cookie, depending upon the client device data received. As such, the embodiment described with respect to FIG. 1 may be iterative in nature, and capable of repetition.

It should be noted that the present invention may comprise systems having different architecture than that which is shown in FIG. 1. For example, in some systems according to the present invention, the server device 104 and the client device 102a may comprise a single physical or logical server, or the server device 104 may comprise a plurality of server devices that function with a load balancer device and store information related to different documents. The system 100 shown in FIG. 1 is merely exemplary, and is used to explain the exemplary methods shown in FIG. 2.

Process

Various methods may be implemented in the environment shown in FIG. 1 and other environments, according to the present invention. Methods according to the present invention may be implemented by, for example, a processor-executable program code stored on a computer-readable medium.

Figure 2:
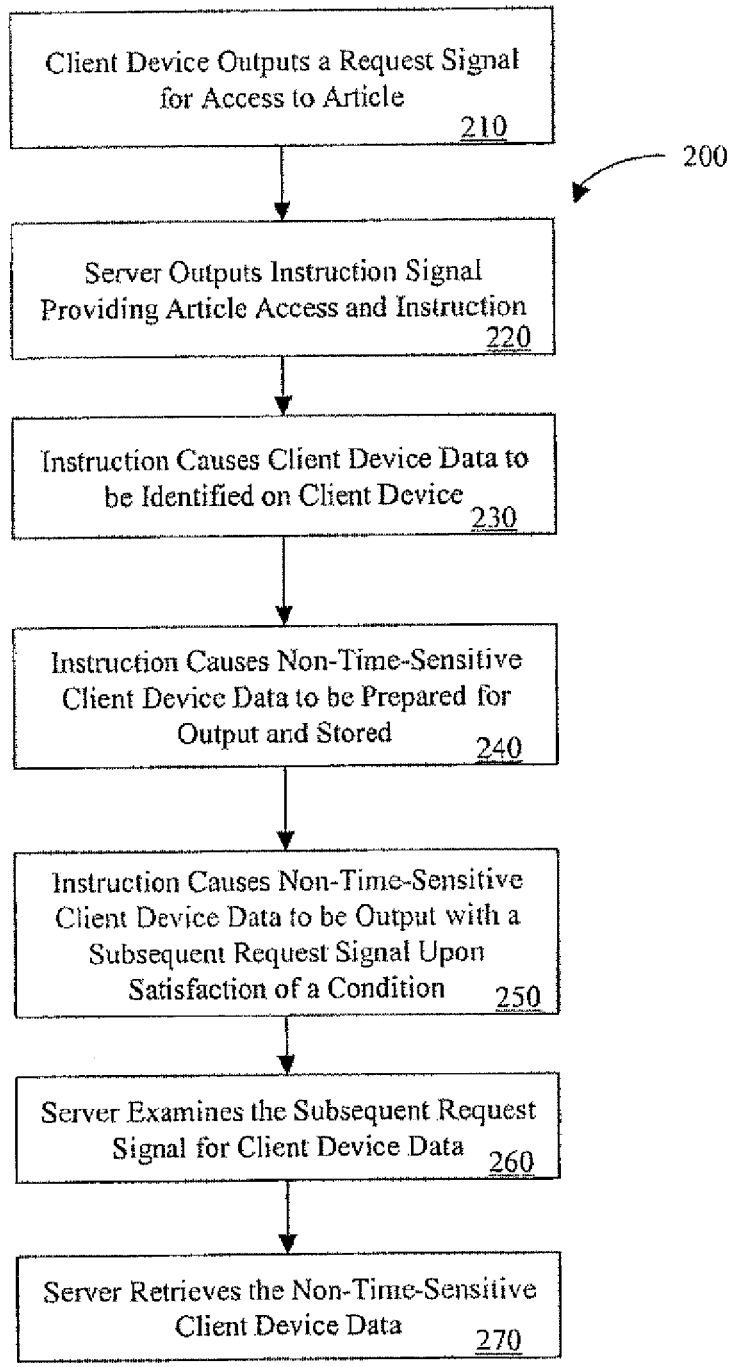
FIG. 2 is a flowchart, illustrating a method for data transfer according to one embodiment of the present invention.

FIG. 2 is a flowchart, illustrating a method 200 for data transfer according to one embodiment of the present invention. As seen in block 210, a client device, such as the client device 102a of FIG. 1, can output a request signal for access to an article. For example, the request signal can be generated by a user selecting a hyperlink to a web page article displayed using a web browser application on a client device. The request signal may be, for example, an HTTP GET or and HTTP POST request signal. The request signal may be output to a server, such as the server device 104 shown in FIG. 1.

As shown in block 220, the server outputs an instruction signal. The instruction signal may include the content of a user requested web page article and an instruction, and may be generated in response to the server's 104 receipt of the request signal 130. The instruction may comprise a JavaScript program such as the instruction 122 of FIG. 1. The instruction may be embedded in the article 120. For example, a JavaScript instruction may be embedded in the HTML code of the requested web page article.

As shown by block 230, the instruction can cause the client device 102a to identify client device data and specifically non-time-sensitive client device data. The non-time-sensitive client device data may comprise the client device data discussed in relation to FIG. 1. For example, the client device data may comprise configuration data or user interaction data. Configuration data can be, for example, the size of the client device's 102a display, what type of pointing device or other peripheral devices are connected to the client device 102a, and any other relevant client device 102a configuration information. User interaction data can be, for example, information about what web pages, email messages, or other articles 120 the user 112a has viewed, the time associated with viewing the article 120, how the user 112a views the article 120, whether the user 112a followed a hyperlink contained in an article, or any other information associated with a user's 112a interaction with an article or entities on the network 106, or with the server device 104.

As shown in block 240, the instruction 122 causes the non-time-sensitive client device data identified by the client device 102a to be prepared for output and stored by the client device. For example, the non-time-sensitive client device data may be set in one or more HTTP cookies and stored in a random access memory such as the memory 108 or an associated storage device, such as a hard drive, according to the JavaScript program instruction 122. Alternatively, the non-time-sensitive client device data may be individually marked and stored in memory associated with an application, such as a web browser or email program, currently running on the client device.

The instruction 122, as shown in block 250, can cause the non-time-sensitive client device data that has been prepared for output to be output with a subsequent request signal upon satisfaction of a condition. The subsequent request signal may comprise the next-generated request signal described in relation to FIG. 1. This request signal may comprise a request for access to another article from a server device and can be an HTTP GET request signal. This request signal may alternatively comprise input to an article and can be an HTTP POST request signal or any other suitable HTTP signal. The condition may comprise a storing of the non-time-sensitive client device data for a predetermined length of time, a storing of a predetermined amount of non-time-sensitive client device data, and/or a generation of a request signal by the client device. For example, the condition may comprise a request by the user 112a of the client device 102a for access to another article maintained by the server. Alternatively or additionally, the condition may comprise the collection of n pieces of non-time-sensitive client device data, or the storing of the non-time-sensitive client device data for a specified period of time.

For example, the non-time-sensitive client device data may be output with a request signal upon the occurrence of the earliest of a collection of 10 pieces of non-time-sensitive client device data by the client device 102a, a passing of 48 hours since the non-time-sensitive client device data was stored by the client device 102a, or a generation of a time-sensitive request signal. The condition can also include checking any expiration data associated with the non-time-sensitive client device data to determine if it has expired. In one embodiment, the non-time-sensitive client device data is not output if it has expired. If the condition is met, the non-time-sensitive client device data can be included with the subsequent request signal. In one embodiment, the non-time-sensitive client device data can be included in the subsequent request signal as extra parameters.

As shown in block 260, the server 104 examines the received request signal 130 for the presence of client device data. For example, the server's processor 116 may perform this function by noting the presence of any HTTP cookies attached to the request signal 130. The processor 116 may then examine the HTTP cookies to determine if they comprise client device data. As noted in block 270, upon finding the client device data with the request signal 130, the server 104 retrieves the non-time-sensitive client device data. For example, the server 104 may extract the non-time-sensitive client device data from an HTTP cookie. The server 104 may then cause the HTTP cookie to be reset. For example, the server may set a cookie expiration date that has already passed to ensure that the HTTP cookie containing the non-time-sensitive client device data is not resent.

In the embodiment shown in FIG. 2, the server may use the non-time-sensitive client device data obtained for various purposes. For example, the server may wish to determine the time the user 112a spent reviewing an article, the portions of the article the user 112a concentrated on or that were visible on the user's 112a graphical user interface. The server may also wish to learn which hyperlinks on a web page article the user 112a followed, and the total time required to load the article on the user's 112a client device 102a.

General

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method comprising:
    receiving at a server system and from a client device, a request for access to an article that is available from the server system; and providing to the client device the article with a JavaScript program embedded in the article, wherein the JavaScript program is configured to (a) cause non-time-sensitive user interaction data to be identified on the client device; (b) cause the non-time-sensitive user interaction data to be set in at least one HTTP cookie and stored by the client device; (c) cause the HTTP cookie to be output by the client device with a subsequent request signal that is directed to the server system, based on satisfaction of a condition, the condition comprising at least one of a generation of a time-sensitive request signal by the client device, a storing of the HTTP cookie for predetermined period of time, and a storing of a predetermined amount of non-time-sensitive user interaction data; and (d) cause the HTTP cookie to be reset after being output with the subsequent request signal that is directed to the server system, and wherein the non-time-sensitive user interaction data is data whose delayed receipt by the server system does not materially affect a client device user's experience in accessing the article.

2. The method of claim 1, wherein the non-time-sensitive user interaction data comprises information associated with one or more of user interactions with the article, user interactions with other articles or entities, and user interactions with the server system.

3. The method of claim 1, wherein the article comprises one or more of a web page, a Portable Document Format file, an electronic mail message, an instant messenger message, a word processor document, a database file, an application program document file, an image file, a video file, and a sound file.

4. The method of claim 1, further comprising generating, by the server system, the JavaScript program in response to receiving the request from the client device for access to the article.

5. The method of claim 1, wherein the request from the client device comprises an HTTP request.

6. The method of claim 1, wherein the condition further comprises closing of an application that was used by the client device to request access to the article.

7. The method of claim 1, further comprising:
checking, by the client device, expiration data for the non-time-sensitive user interaction data; and
using the expiration data to determine whether to cause the non-time-sensitive user interaction data to be output to the server system.

8. A computer-implemented method comprising:
receiving at a server system and from a client device, a request for access to an article that is available from the server system; and
providing to the client device the article with a computer program embedded in the article,
wherein the computer program is configured to (a) cause non-time-sensitive client device data to be identified on the client device; (b) cause the non-time-sensitive client device data to be prepared for output and stored by the client device; and (c) cause the non-time-sensitive client device data to be output by the client device with a subsequent request signal that is directed to the server system, based on satisfaction of a condition, the condition comprising at least one of a generation of a time-sensitive request signal by the client device, a storing of the non-time-sensitive client device data for predetermined period of time, and a storing of a predetermined amount of non-time-sensitive client device data, and wherein the non-time-sensitive client device data is data whose delayed receipt by the server system does not materially affect a client device user's experience in accessing the article.

9. The method of claim 8, wherein the non-time-sensitive client device data comprises at least one of configuration data and user interaction data.

10. The method of claim 8, wherein the non-time-sensitive client device data comprises information associated with one or more of user interactions with the article, user interactions with other articles or entities, and user interactions with the server system.

11. The method of claim 8, wherein the article comprises one or more of a web page, a Portable Document Format file, an electronic mail message, an instant messenger message, a word processor document, a database file, an application program document file, an image file, a video file, and a sound file.

12. The method of claim 8, further comprising generating, by the server system, the computer program in response to receiving the request from the client device for access to the article.

13. The method of claim 8, wherein the request from the client device comprises an HTTP request.

14. The method of claim 8, wherein the condition further comprises closing of an application that was used by the client device to request access to the article.

15. The method of claim 8, further comprising checking, by the client device, expiration data for the non-time-sensitive client device data, and using the expiration data to determine whether to cause the non-time-sensitive client device data to be output to the server system.

16. A computer server system comprising:
an interface configured to allow the server system to communicate with one or more client devices over a network;
memory that stores program code that can be provided to a client device in response to a request from the client device for access to an article that is available from the server system, wherein the program code is configured to (a) cause non-time-sensitive client device data to be identified on the client device; (b) cause the non-time-sensitive client device data to be prepared for output and stored by the client device; and (c) cause the non-time-sensitive client device data to be output by the client device with a subsequent request signal that is directed to the server system, based on satisfaction of a condition, the condition comprising at least one of a generation of a time-sensitive request signal by the client device, a storing of the non-time-sensitive client device data for predetermined period of time, and a storing of a predetermined amount of non-time-sensitive client device data, and wherein the non-time-sensitive client device data is data whose delayed receipt by the server system does not materially affect a client device user's experience in accessing the article; and
a processor coupled to the memory, wherein the processor is configured to cause the client device to be provided with the article with the program code embedded in the article.

17. The system of claim 16, wherein the non-time-sensitive client device data comprises at least one of configuration data and user interaction data.

18. The system of claim 16, wherein the non-time-sensitive client device data comprises information associated with one or more of user interactions with the article, user interactions with other articles or entities, and user interactions with the server system.

19. The system of claim 16, wherein the article comprises one or more of a web page, a Portable Document Format file, an electronic mail message, an instant messenger message, a word processor document, a database file, an application program document file, an image file, a video file, and a sound file.

20. The system of claim 16, wherein the request from the client device comprises an HTTP request.

21. The system of claim 16, wherein the condition further comprises closing of an application that was used by the client device to request access to the article.

22. The system of claim 16, wherein the program code is further configured to cause the client device to check expiration data for the non-time-sensitive client device data, and use the expiration data to determine whether to cause the non-time-sensitive client device data to be output to the server system.

* * * * *